Feb. 27, 1934.  H. L. KUTTER  1,949,053
CLUTCH
Filed Jan. 28, 1931   2 Sheets-Sheet 1

Inventor
Herman L. Kutter
Maréchal + Noé
Attorney

Feb. 27, 1934.   H. L. KUTTER   1,949,053
CLUTCH
Filed Jan. 28, 1931   2 Sheets-Sheet 2

Inventor
Herman L. Kutter
By Maréchal & Noe
Attorney

Patented Feb. 27, 1934

1,949,053

UNITED STATES PATENT OFFICE 1,949,053

CLUTCH

Herman L. Kutter, Hamilton, Ohio, assignor to The Black-Clawson Company, Hamilton, Ohio, a corporation of Ohio Application January 28, 1931. Serial No. 511,837

8 Claims. (Cl. 192—69)

This invention relates to clutches and more particularly to clutches adapted for heavy power requirements.

One object of the invention is the provision of a multiple disk clutch of compact and sturdy construction that will transmit the required loads smoothly and effectively during engagement of the clutch.

Another object of the invention is the provision of a disk clutch having eccentric means for pressing the driving and driven disks together, the eccentric means being operated by a sliding member which encloses the operating parts when the clutch is in running position.

Further objects and advantages of the invention will be apparent from the following description, the appended claims and the accompanying drawings, in which—

Figure 1:
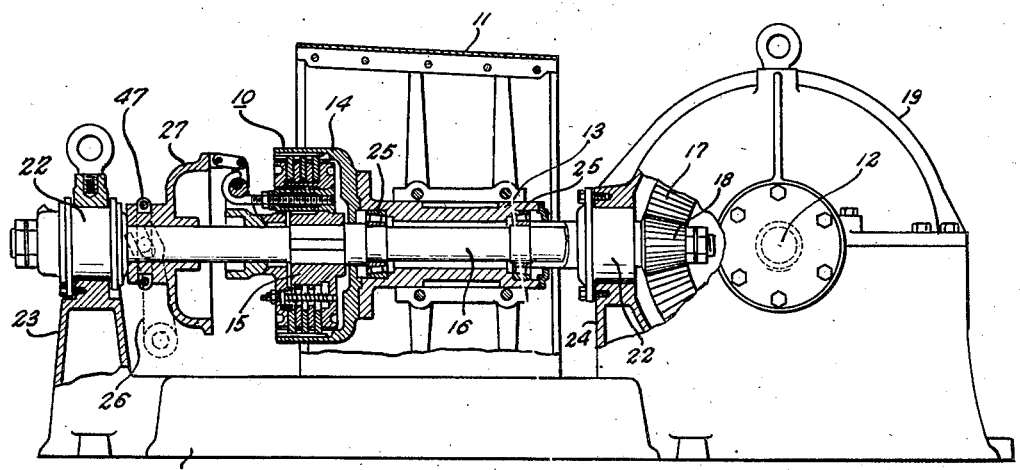
Fig. 1 is an elevation shown partly in vertical section of a power drive having a clutch embodying the present invention.

Referring more particularly to the drawings by reference numerals, corresponding numerals designating like parts of the various views, Fig. 1 shows a multiple disk clutch 10 embodying the present invention, incorporated in a drive system. For purposes of illustration of one use of the invention the clutch is shown adapted to transmit power from a driving pulley 11 to a slow speed driven shaft 12. As shown, this power drive includes the pulley hub 13, the clutch body 14, to which the pulley hub is secured, the driven clutch hub 15, and the power shaft 16 which is geared to the driven shaft 12 by means of the spiral bevel gears 17 and 18 provided on the two shafts 12 and 16 respectively. Preferably the gears 17 and 18 are contained in a gear housing 19 which forms a suitable support for the driven shaft 12. This housing may be mounted on or provided as a part of the supporting base 20 of the power drive. The power shaft 16 is rotatably supported by means of anti-friction bearings 22 in the upstanding portions 23 and 24 of the support.

The power shaft 16 forms a support for the clutch, being keyed to the clutch hub 15 and rotatably supporting the pulley and the pulley hub by means of anti-friction bearings 25. Thus when the clutch is disengaged the pulley and the clutch body 14 and the driving plates of the clutch rotate freely, while the shaft 16, the driven plates of the clutch and the driven shaft 12 remain stationary. When the clutch is engaged, as by means of the operating lever 26 and a slide 27, the clutch is engaged and power is transmitted to the shaft 16 and thus to the driven shaft 12.

Figure 2:
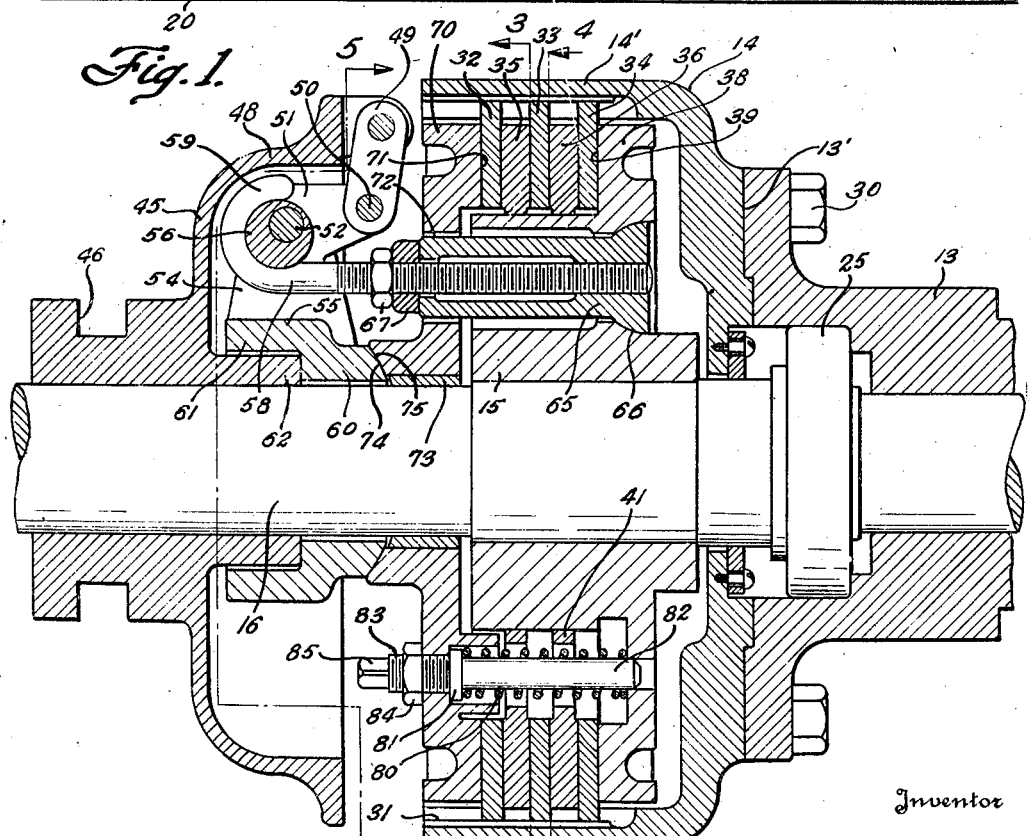
Fig. 2 is a longitudinal section through the clutch showing the clutch parts in driving positions.
Figure 3:
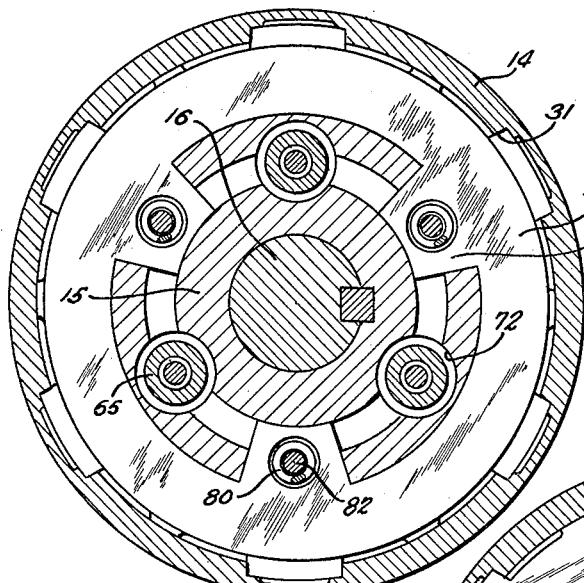
Fig. 3 is a transverse section on the line 3—3 of Fig. 2 taken along a side of one of the driven disks of the clutch.
Figure 4:
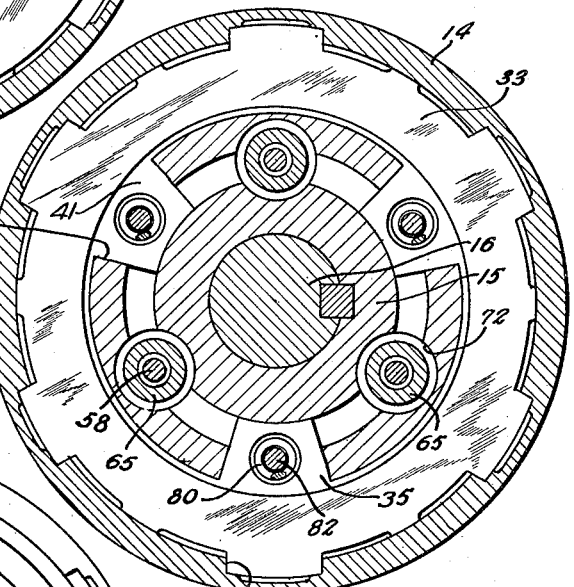
Fig. 4 is a section on the line 4—4 of Fig. 2.
Figure 5:
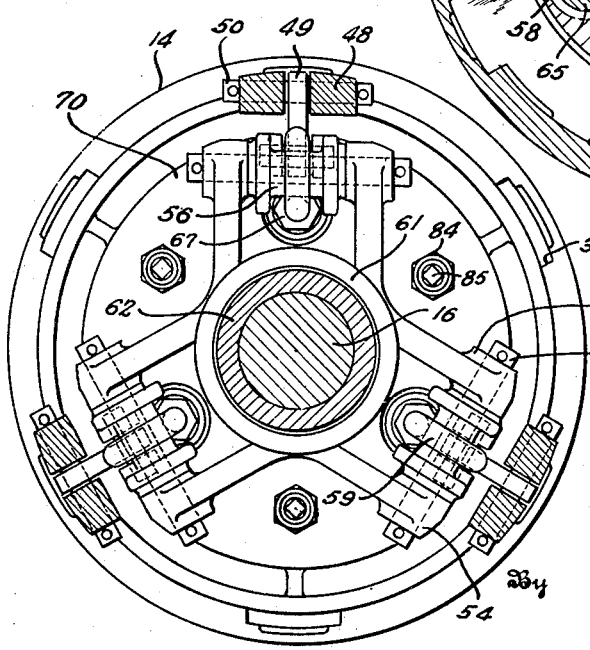
Fig. 5 is a section on the line 5—5 of Fig. 2.

Referring now more particularly to Fig. 2 in which the constructional form of the clutch, shown in its engaged position, will be more apparent, the clutch body 14 is preferably a metal shell having a cylindrical body portion 14' and an end plate 13' which is secured to the pulley hub 13 by means of bolts 30 or the like. The cylindrical portion of the body member is provided with grooves 31, shown six in number, in which are slidably engaged the radially projecting lug portions of the annular driving disks 32, 33 and 34. While three driving disks are shown in slidable engagement with the clutch body, it will be apparent that the driving disks may be more or less in number.

Between the driving disks 32, 33 and 34 are driven disks 35 and 36 slidably mounted on the clutch hub 15 which is keyed or otherwise securely fastened to the power shaft 16. The clutch hub has an end plate 38 provided with a clutch surface 39 engageable with a side of the driving disk 34. In the embodiment herein shown, there are three rather deep grooves 40 in the clutch hub, the sides of which are slidably engaged with the inwardly extending radial lugs or projections 41 of the driven disks 35 and 36. It will thus be apparent that the driven disks are held so that they must rotate with the clutch hub, but can move axially away from the end plate 38, and while the driving disks 32, 33 and 34 are held so that they must rotate with the clutch body 14, they are also movable in an axial direction with relation to one another and with relation to the driven disks and the end plate 38.

The driven disks are preferably of cast iron. The driving disks are of suitable material surfaced with brake lining material or are of bronze having a high lead content which is sweated out during operation, making the clutch self-lubricating. These disks are adapted to be forced into driving contact with one another in the following manner. Slidably supported on the power shaft 16 is a clutch operating member shown as a lock slide 45 having a groove 46 which receives the thrust collar 47. This thrust collar may be forced to the right or left by means of the manually operated pivoted lever 26, from the disengaged position shown in Fig. 1 to the engaged position shown in Fig. 2. The lock slide embodies a dish or cup-shaped plate 48 having a diameter about equal to that of the clutch body 14. Pivotally supported on the peripheral portion of the lock slide are a plurality of links 49. These links are pivotally connected by pivot pins 50 to eccentric cam levers 51 fixed to shafts 52. The shafts 52 are pivotally supported in the spaced trunnions 54 on a carrying rocker plate 55. Between each pair of trunnions 54 the shafts 52 are provided with a cam eccentric 56. Engaging each of these cam eccentrics is a hook-shaped clamp bolt or stud 58. The hooked end 59 of the clamp bolt has a curvature corresponding to the diameter of the eccentric cam portion 56 so it will be apparent that if the eccentric levers are rotated and move the shafts 52 the eccentric cam portions 56 will be swung so as to force the clamp bolts 58 endwise. From the position of the parts shown in Fig. 2 it will be apparent that the rotation of the cam shafts from the position shown in Fig. 1 has had the effect of creating a force on the clamp bolts 58, tending to move them toward the left.

The rocker plate 55 which carries the eccentric shafts has a hub portion 60, somewhat larger in diameter than the outside diameter of the shaft 16. The inside diameter of the hub part may be about 1/16" or 1/8" larger than the diameter of the shaft 16, when the diameter of the latter is about 4". The hub portion 60 is provided with a flanged part 61 extending over and around the inwardly projecting part 62 of the lock slide, but with about 1/8" or so clearance. The hub portion of the rocker plate is thus held approximately centrally on the shaft 16, but some tilting or rocking motion is permitted to provide for equal force on the three clamp bolts of the clutch.

The clamp bolts 58 are threaded into adjusting studs or nuts 65 which are elongated headed members extending freely through holes in the clutch hub and through holes in the driven disks of the clutch. The heads of the adjusting nuts are preferably spherically curved as indicated at 66 and are received in spherical seats in the end plate 38 of the clutch hub. The body portions of the adjusting nuts are permitted to have considerable motion by the clearance between the outsides of the body portions and the inside diameter of the holes in the clutch hub and in the driven disks through which they extend. The adjusting nuts may be rotatably adjusted with respect to the threaded ends of the clamp bolts, the two parts being normally secured in their proper relationship by means of holding nuts 67.

Between the rocker plate 55 and the clutch hub 37 is a pressure plate 70. This pressure plate has a friction surface 71 adapted to engage a side of the driving disk 32. In the pressure plate 70 are openings 72 through which the body portions of the adjusting nuts 65 freely extend. In the pressure plate is fixed a bushing 73, the bushing preferably being freely mounted on the shaft 16 so as to provide for endwise movement of the pressure plate on the shaft. On the outer side of the pressure plate, at its hub portion, the latter is provided with a concave spherical surface or seat 74 which is engaged by the complementary spherical surface or seat 75 of the rocker plate. The rocker plate is thus adapted to be held securely against the pressure plate when the clutch is engaged, but the rocker plate may rock or tilt somewhat to compensate for inequalities in the length of the thrust rods and provide for even pressure at the three equally spaced points of pressure application.

It will now be apparent that when the lock slide is moved to its extreme left-hand position as viewed in Fig. 1, the link connections between the lock slide and the three eccentric shafts causes rotational movements of the cam shafts so as to relieve the thrust of the clamp bolts. The heads of the clamp bolts being held against movement parallel to the axis of the clutch shaft, prevent any endwise movement of the clamp bolts, so that the rotation of the cam shafts has the effect of permitting some little endwise movement of the rocker plate away from the friction disks and away from the end plate 70. However, the amount of movement of the rocker plate is limited to the amount of eccentricity of the cams 56 so that the lock slide moves away from the rocker plate as the rocker plate moves a little distance away from the pressure plate 70. All pressure between the spherical surfaces 74 and 75 of the pressure plate and the rocker plate is now relieved so that the pressure plate can move a little distance away from the end plate 38 and relieve the pressure between the various driving and driven surfaces of the clutch. The driven surfaces including the end plate 38 and the pressure plate 70 and also the lock slide will now be stationary when the clutch is disengaged, although the clutch body 14 and the driving disks will continue their rotation. As the cam shafts rotate to relieve the pressure exerted by the clamp bolts and the rocker plate against the pressure plate 70 of the clutch, the clearance space between the adjusting nut and the holes in the clutch hub and the pressure plate 70 permits some rocking movements of the adjusting bolts so that the parts will not bind, it being obvious that the hook end of the clamp bolt viewed in Fig. 2 will be lowered as the clutch is disengaged.

To engage the clutch and thus effect transmission of power from the driving pulley 11 to the shaft 16 the lock slide is of course moved toward the clutch body so as to rock the eccentric shafts and pull the rocker plate against the spherical surface of the pressure plate 70 and thus clamp the several driving and driven members of the clutch together with an equal pressure at the three points of pressure application, the rocker plate tilting if necessary to insure the equal application of force on the three positions of pressure application.

When the clutch is disengaged, and the pressure relieved on the pressure plate 70, the latter will be yieldingly forced outwardly away from the end plate 38 by means of a spring 80 bearing at one end against the end plate 38 and at the other end against a collar 81 on an adjustable pin 82. The pin 82 has a threaded end 83 which is threaded in the pressure plate 70 of the clutch and adjustably held in its desired position by a clamp nut 84. The end of the pin 82 which projects out from the pressure plate has a square end 85 so that it may be readily turned after the nut 84 is loosened to vary the pressure exerted by the spring 80. The pin 82 projects through openings in the driven disks and in the end plate 38 of the clutch. Three of these spring pins are preferably employed, spaced equal distances apart around the axis of the shaft 16, preferably at the location of the three slots 40 in the clutch hub. The springs 80 are of course effective in moving the pressure plate so as to relieve the pressure on the driving surfaces of the clutch when the rocker plate 55 is moved to the left, to clutch disengaged position.

It will be apparent that when the clutch is engaged, the lock slide 48 will enclose the operating parts of the clutch as the lock slide at this time is rather closely adjacent the pressure plate 70, and has a diameter substantially equal to the diameter of the clutch body. When the clutch is engaged of course the rocker plate and the lock slide are all rotated by the driving surfaces of the clutch, and all of these rotating parts present an almost unbroken smooth peripheral surface that will not be likely to catch any nearby object. When the clutch is disengaged the rocker plate, eccentric shafts and operating links are exposed, but at this time these parts are stationary. It will also be now apparent that the arrangement of the pressure applying tension bolts between the slots in the hub member and extending through the hub member interiorly of the driving disks provides a small and compact arrangement of parts and permits the use of a comparatively small cam carrier plate such as may be enclosed by the dish-like lock slide member 45.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A clutch comprising an outer cylindrical body member, an inner hub member to be clutched thereto, said inner hub member having longitudinally extending slots, a set of friction plates having projections slidable in said slots, a second set of friction plates slidably held on said body member, tension rods extending through said hub member and provided inwardly of said second set of friction plates, cam means engaging said rods for pressing said friction plates together, a cam carrying member concentric with said hub member, and movable operating means forming a protecting casing about said cam means and cam carrying member.

2. A clutch comprising an outer body member, an inner hub member to be clutched thereto, friction plates rotatable with and slidably mounted on said hub and body members, pressure mechanism for pressing the friction plates together including a cam carrying member concentric with said hub member, rotatable cams mounted on said cam carrying member for operating said pressure mechanism, and a cup-shaped operating member operably connected to said cams and movable while operating said cams from a position substantially enclosing the cams and close to a side of the body member to a position removed a substantial distance from the body member and removed from the cams.

3. A clutch comprising an outer body member, a rotatable shaft, a longitudinally slotted hub member fixed to said shaft, a friction plate slidable along the slots of said hub member, a friction plate slidably held on the body member, an end plate rigid with said hub member and having spherically curved seats, tension members having spherically curved heads mounted in said seats, a pressure plate through which said tension members extend slidably fitting the slots of said hub member, the friction plates being arranged between the end plate and the pressure plate, a cam carrier loose on said shaft and abutting said pressure plate, cams on said carrier engaging said tension members, and means for rotating said cams to draw the end plate and the pressure plate together.

4. A clutch comprising an outer body member, a rotatable shaft, a longitudinally slotted hub member fixed to said shaft, a friction plate slidable along the slots of said hub member, a friction plate slidably held on the body member, an end plate rigid with said hub member and having spherically curved seats, tension members having spherically curved heads mounted in said seats, a pressure plate through which said tension members extend slidably fitting the slots of said hub member, the friction plates being arranged between the end plate and the pressure plate, a cam carrier loose on said shaft and abutting said pressure plate, cams on said carrier engaging said tension members, a cup-shaped operating member axially movable on said shaft from a position adjacent a side of the body member and enclosing said cam carrier to a position removed therefrom, and links connecting the peripheral portion of said operating member to said cams.

5. A clutch comprising an outer body shell member, a rotatable shaft rotatably supporting said body member, friction plates having projections slidably supported in said body member, a hub member fixed to said shaft and having longitudinally extending slots, friction plates having projections slidable in said slots, a pressure plate supported on said shaft, studs extending through said hub member and through said pressure plate, a cam carrier on said shaft, eccentric cams rotatably supported on said carrier and engaging the ends of said studs, and means for rotating said eccentric cams.

6. A clutch comprising an outer body shell member, a rotatable shaft rotatably supporting said body member, friction plates having projections slidably supported in said body member, a hub member fixed to said shaft and having longitudinally extending slots, friction plates having projections slidable in said slots, a pressure plate supported on said shaft, spherically headed studs extending through said hub member and through said pressure plate, said hub member having spherical seats receiving said heads, a cam carrier on said shaft, eccentric cams rotatably supported on said carrier and engaging the ends of said studs, and means for rotating said eccentric cams.

7. A clutch comprising an outer body shell member, a rotatable shaft rotatably supporting said body member, friction plates having projections slidably supported in said body member, a hub member fixed to said shaft and having longitudinally extending slots, friction plates having projections slidable in said slots, a pressure plate supported on said shaft, studs extending through said hub member and through said pressure plate, a cam carrier on said shaft, eccentric cams rotatably supported on said carrier and engaging the ends of said studs, a cup-shaped operating member slidably mounted on said shaft from a position enclosing said cam carrier and adjacent said pressure plate to a position removed therefrom, operating connections between said operating member and said cams, and means for shifting said operating member along said shaft to engage and disengage the clutch.

8. A clutch comprising an outer body member forming the driving member of the clutch, a driven shaft rotatably supporting said body member and adapted to be driven therefrom, driving friction plates slidably held on said body member and provided with central openings, a hub member fixed to said shaft, driven friction plates slidably held on said hub member, tension members extending through said hub member within the openings in said driving friction plates, pressure means cooperating with said tension members and fixed against rotational movement with respect to said shaft for holding said friction plates together, and a cup-shaped operating member for operating said pressure means and movable from a position adjacent a side of said body member when the clutch is engaged to a position removed therefrom when the clutch is disengaged, whereby the said pressure means will be enclosed by said operating member when rotating.

HERMAN L. KUTTER.